March 31. 1925.
C. MACMILLAN
PROPELLER
Filed July 26, 1923
1,531,967
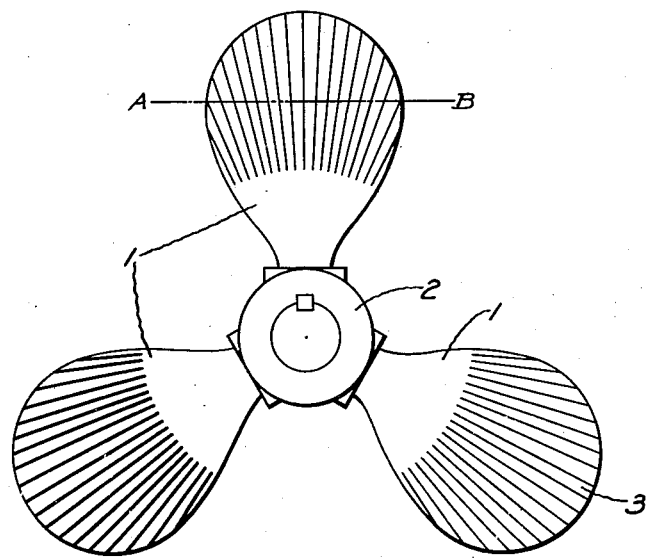
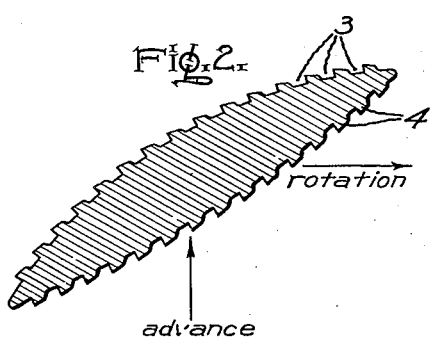
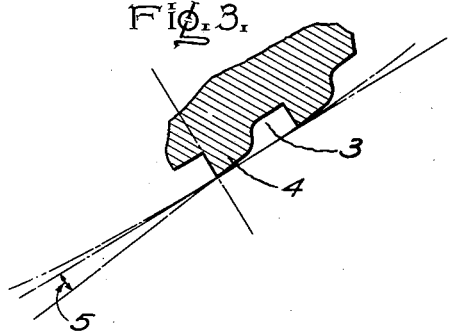
Inventor:
Campbell Macmillan,
by *Alexander S. Smith*
His Attorney.

Patented Mar. 31, 1925.

1,531,967

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

PROPELLER.

Application filed July 26, 1923. Serial No. 654,010.

*To all whom it may concern:*

Be it known that I, CAMPBELL MACMILLAN, a citizen of the United States, residing at Schenectady, in the county of Schenectady, State of New York, have invented certain new and useful Improvements in Propellers, of which the following is a specification.

My invention relates to marine propellers and other devices which operate through relative movement between a fluid and the surface of a solid, and has for its object the provision of means for minimizing the fluid friction incident to operation of devices of this character.

Propeller losses are of two kinds which may be designated as impulsive losses and as frictional losses. Since the force for moving a vessel is produced by giving momentum of sternward velocity to the mass of the wake stream, it is impossible to dispense with the loss of kinetic energy in the wake stream, but this loss may be diminished by giving a small slip velocity to a large mass of water rather than a higher slip velocity to a smaller mass. In other words, a large propeller has a higher impulsive efficiency than one of smaller diameter. The kinetic losses which reduce the impulsive efficiency may be assumed to disappear when the propeller runs with zero value of thrust and true slip. Assuming a frictionless propeller the torque would also disappear under these conditions.

The frictional losses, unlike the impulsive losses, are not essential to the operation of the propeller and if they can be reduced a higher propeller efficiency will be realized. These losses do not vanish at zero true slip. Therefore, for a given propeller, a reduction of friction causes the greatest improvement in efficiency at small slips and light loads but for practical reasons it is desirable to select a propeller of somewhat different characteristics which is suited to take full advantage of the improved efficiency at full working load.

The formulæ for fluid friction are radically different from those representing solid friction. The coefficient of solid friction is directly proportional to a tangential force per unit of normal force exerted between the two surfaces and is independent of the area of surface in contact. The corresponding coefficient of fluid friction is a force per unit area of contact surface and is independent of normal force at the wetted surface. The usual values of working pressures in propeller practice run up to about eleven pounds per square inch of projected area, although instances of defective operation due to cavitation have appeared with pressures as low as five pounds per square inch.

In order to improve the efficiency of a given propeller strong enough to absorb a specified amount of power at a given speed, the most obvious method is to use materials of the greatest strength and smoothest surface. The possible improvements in this direction however are very limited. Full use has been made of the best material available. In the case of the propeller blades, surface friction with attendant eddies is the important consideration and, provided additional eddies are not introduced by the change, the reduction of surface friction should be directly proportional to the reduction of surface in contact with the water. In order to reduce surface friction, I propose to cut shallow radial grooves on the blade surfaces leaving between the grooves ridges the tops of which constitute the working surface of the propeller. The tops of these ridges may be tilted at an angle corresponding to the slip angle or may be given a small additional angle for the purpose of deflecting the water so that it jumps the groove without striking the edge of the ridge which follows it. At sufficiently high velocities the water will bridge the grooves tangentially without filling them and any broken water which does get into them is thrown out radially by centrifugal force leaving them filled with water vapor of low pressure and air.

My invention will be better understood on reference to the following description taken in connection with the accompanying drawings, and its scope will be pointed out in the appended claims.

Referring now to the drawing: Fig. 1 shows a propeller constructed in accordance with my invention; Fig. 2 is a section taken on the line A—B of Fig. 1; and Fig. 3 is a sectional view showing the arrangement of the ridges as related to the general contour of the blade surface.

Fig. 1 shows a propeller provided with blades 1 mounted on a hub or boss 2 and provided with grooves 3 for the purpose of reducing the friction incident to movement of the propeller through the water. Since the power absorption over the propeller varies as the cube of the distance from its axis of rotation, the inner half of the blade accounts for only one-eighth of the power. The surface friction follows approximately the same law. The grooves may therefore be confined to the outer portions of the blades as indicated in Fig. 1. Assuming a 16 foot wheel, there exists a minimum centrifugal force of about thirteen and one-half pounds per pound of water at the inner ends of the grooves which increases to fifty-four pounds per pound at the blade tips. Water is also removed from the grooves by a form of injector action. That is to say the water which is stationary relatively to the blade is in contact with stationary water opposite the blade and the relative velocity between the two bodies of water is several thousand feet per minute. Under these conditions the water in the grooves is dragged out over the sloping surfaces of the intervening ridges.

Fig. 2 indicates the direction of propeller rotation as related to the movement of the vessel under normal operating conditions and also shows the relation existing between the grooves 3 and ridges 4 which form the surface of the blade 1.

Fig. 3 shows the relation of the ridged surfaces to the average blade surface. The active surfaces of the ridges are approximately helical in outline and disposed at an angle with respect to the average contour of the blade surface which may vary from 10 to 50 degrees, when half of the surface is removed by grooving, as indicated by the angle 5. There is thus produced a strong and rugged propeller having a comparatively small working area and a correspondingly low friction loss.

My invention is not limited to the specific embodiment shown and described. The advantages gained from grooving a surface to minimize the friction produced through relative movement between it and a fluid are by no means confined to marine or other propellers but may be realized in connection with other apparatus which depends for its operation on contact between a fluid and the surface of a solid. While I have described and illustrated but one embodiment of my invention, it will be apparent to those skilled in the art that various changes and modifications, may be made in the apparatus without departing from the spirit and scope of my invention as set forth by the appended claims.

What I claim as new and desire to secure by Letters Patent of the United States, is:—

1. A device having a surface arranged to move relatively to a fluid in contact therewith, characterized by the fact that said surface comprises grooves disposed transversely to the direction of said relative movement and separated by ridges the top surfaces of which constitute the working surfaces of said device whereby the friction between said fluid and said surface is reduced.

2. A device having a surface arranged to move relatively to a fluid in contact therewith, characterized by the fact that said surface comprises grooves disposed transversely to the direction of said relative movement and separated by ridges, the top surfaces of said ridges being disposed at an angle with respect to the average contour of said surface, whereby friction between said fluid and said surface is reduced.

3. A propeller comprising blades arranged to move relatively to a fluid in contact therewith and having a substantial part of their working surfaces formed of grooves disposed transversely to the direction of said movement, said grooves being separated by ridges the top surfaces of which form the principal working surfaces of said blades, whereby friction between said blades and said fluid is reduced.

4. A propeller comprising a blade arranged to move relatively to a fluid in contact therewith and having a substantial part of its working surfaces formed of grooves disposed transversely to the direction of said movement, said grooves being separated by ridges the top surfaces of which form the principal working surfaces of said blades and are disposed at an angle with respect to the average contour of said blade whereby the friction between said fluid and said blade is reduced.

In witness whereof, I have hereunto set my hand this 25th day of July, 1923.

CAMPBELL MACMILLAN.